(12) United States Patent
Van Wageningen et al.

(10) Patent No.: US 10,396,595 B2
(45) Date of Patent: Aug. 27, 2019

(54) INDUCTIVE WIRELESS POWER TRANSFER WITH TIME SLOTTED COMMUNICATION

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 94 days.

(21) Appl. No.: 15/560,259

(22) PCT Filed: Apr. 8, 2016

(86) PCT No.: PCT/EP2016/057677
§ 371 (c)(1),
(2) Date: Sep. 21, 2017

(87) PCT Pub. No.: WO2016/173822
PCT Pub. Date: Nov. 3, 2016

(65) Prior Publication Data
US 2018/0069430 A1 Mar. 8, 2018

(30) Foreign Application Priority Data

Apr. 29, 2015 (EP) ..................... 15165700

(51) Int. Cl.
*H04B 5/00* (2006.01)
*H02J 50/10* (2016.01)
(Continued)

(52) U.S. Cl.
CPC .............. *H02J 50/10* (2016.02); *H02J 7/025* (2013.01); *H02J 50/40* (2016.02); *H02J 50/80* (2016.02);
(Continued)

(58) Field of Classification Search
CPC .. H02J 50/10; H02J 50/80; H02J 50/40; H02J 7/025; H04B 5/0037; H04B 5/0025;
(Continued)

(56) References Cited

U.S. PATENT DOCUMENTS

| 5,434,847 A | 7/1995 | Kou |
| 7,440,422 B1 | 10/2008 | Holma et al. |

(Continued)

FOREIGN PATENT DOCUMENTS

| JP | 2010074466 A | 4/2010 |
| WO | 2012058724 A1 | 5/2012 |

*Primary Examiner* — Andrew Wendell

(57) ABSTRACT

A method is presented of allocating communication time slots contained in repeating frames for communication between an inductive wireless power transmitter and at least two inductive wireless power receivers, wherein the power transmitter and the power receivers are arranged to communicate by means of modulation and demodulation of an inductive power signal. The transmitter sends synchronization messages marking the start of the communication time slots and the frames, and messages indicating if a time slot is unallocated. A receiver may send, during an unallocated time slot, send a message to the transmitter requesting allocation of the unallocated communication time slot. The transmitter subsequently sends messages to indicate if the communication was successfully received, and if the allocation request is granted.

14 Claims, 7 Drawing Sheets

(51) Int. Cl.
  *H02J 7/02* (2016.01)
  *H02J 50/40* (2016.01)
  *H02J 50/80* (2016.01)
(52) U.S. Cl.
  CPC ......... *H04B 5/0025* (2013.01); *H04B 5/0037* (2013.01); *H04B 5/0075* (2013.01)
(58) Field of Classification Search
  CPC .................. H04B 5/0075; H04W 72/0446; H04W 72/04; H04W 56/001
  See application file for complete search history.

(56) References Cited

U.S. PATENT DOCUMENTS

| | | | |
|---|---|---|---|
| 2002/0105976 A1* | 8/2002 | Kelly | H04B 7/18582 370/519 |
| 2009/0271048 A1 | 10/2009 | Wakamatsu | |
| 2009/0284082 A1 | 11/2009 | Mohammadian | |
| 2010/0181961 A1 | 7/2010 | Novak et al. | |
| 2011/0149778 A1* | 6/2011 | Yu | H04W 52/241 370/252 |
| 2012/0163347 A1* | 6/2012 | Joo | H04W 72/0446 370/336 |
| 2013/0058318 A1* | 3/2013 | Bhatia | H04W 56/003 370/337 |
| 2013/0201860 A1* | 8/2013 | Yu | H04L 5/0048 370/252 |
| 2013/0234661 A1 | 9/2013 | Yang et al. | |
| 2014/0254431 A1* | 9/2014 | Yan | H04Q 11/04 370/255 |
| 2015/0098353 A1 | 4/2015 | Kang et al. | |
| 2015/0171931 A1* | 6/2015 | Won | H02J 5/005 320/108 |
| 2015/0194814 A1 | 7/2015 | Taylor et al. | |
| 2016/0380488 A1* | 12/2016 | Widmer | H04B 5/0037 324/207.15 |
| 2017/0207663 A1 | 7/2017 | Park et al. | |

\* cited by examiner

INDUCTIVE WIRELESS POWER TRANSFER WITH TIME SLOTTED COMMUNICATION

CROSS-REFERENCE TO PRIOR APPLICATIONS

This application is the U.S. National Phase application under 35 U.S.C. § 371 of International Application No. PCT/EP2016/057677 filed on 8 Apr. 2016, which claims the benefit of European Patent Application No. 15165700.4, filed on 29 Apr. 2015. These applications are hereby incorporated by reference herein.

FIELD OF THE INVENTION

The present invention relates to a method of allocating communication time slots contained in repeating frames for communication between an inductive wireless power transmitter and at least two inductive wireless power receivers. The invention further relates to an inductive wireless power transmitter, and to an inductive wireless power receiver.

BACKGROUND OF THE INVENTION

Inductive wireless power transfer is becoming increasingly popular. In this technology a power transmitter device generates a magnetic field using a primary coil. A power receiver device taps energy from this magnetic field using a secondary coil, inductively coupled to the primary coil by proximity. Thus power is transferred without making electrical contact. One such technology is standardized in the Wireless Power Consortium, and is known under the name of Qi.

In an application example of this technology, a mobile phone acts as the power receiver and has a secondary coil built in. For charging of the phone's batteries, it is placed on the surface of a wireless charging pad that has a primary coil built in. The two coils are coupled by proper placement and alignment, and power is transferred from the charger to the phone wirelessly by induction. Thus the phone can be charged by simply placing it on a dedicated charger surface, without the need for attaching connectors and wires to the phone. The charging of a mobile phone or other portable device is a low-power application, with typically about 1 to 5 watt of power transferred from transmitter to receiver. High-power applications of inductive wireless power transfer may be used for cooking food or even charging an electrical car wirelessly.

The Qi standard for inductive wireless power transfer specifies a communication interface for communication between a wireless power transmitter and a wireless power receiver. Such communication is needed a.o. to properly match the power transmission to the characteristics of the receiving device. So far, this communication has been specified only for a single transmitter working with a single receiver. Only receiver to transmitter communication is supported, achieved by load modulation on the receiver side. The load modulation leads to modulation of the transmitted power, which can be detected on the transmitter side as modulation of the voltage or current in the primary coil. The single receiver communicates its power needs, and the transmitter obliges. This is described e.g. in WO 2014020464.

A solution is needed for the situation where a single primary coil (or multiple primary coils operated in series or parallel) in a power transmitter is coupled to multiple secondary coils in multiple power receiver devices. This may arise for example in case of a larger charging pad that can accommodate several portable devices simultaneously.

SUMMARY OF THE INVENTION

It is an object of the invention to provide a wireless powering technology enabling communication between a single inductive wireless power transmitter and multiple inductive wireless power receivers. The inventors have realized that multiple receivers can each communicate with a single transmitter using load modulation, but a receiver will be unable to detect communication from another receiver because the coupling between the secondary coils of two receivers is far too weak. This means a receiver is unable to back off when another receiver is communicating simultaneously, because the receiver simply cannot tell that this is the case. Therefore an approach is needed in which communication from the multiple receivers is separated to avoid collisions by multiple receivers communicating simultaneously, and organised without the need for communication, or even detection of communication, between receivers.

This is achieved, according to a first aspect of the invention, by a method of allocating communication time slots contained in repeating frames for communication between an inductive wireless power transmitter and at least two inductive wireless power receivers, wherein the power transmitter and the power receivers are arranged to communicate by means of modulation and demodulation of an inductive power signal, the method comprising the steps of:
- sending, by the transmitter, synchronization messages marking the start of the communication time slots and the frames,
- sending, by the transmitter, before the start of an unallocated communication time slot, a message indicating that the unallocated communication time slot is unallocated,
- sending, by a first receiver, during the unallocated communication time slot, an allocation request message to the transmitter to request allocation of the unallocated communication time slot to the first receiver,
- sending, by the transmitter, after the end of the unallocated communication time slot, a reception status message indicating reception success of a message during the unallocated communication time slot,
- further sending, by the transmitter, in case of successful reception of the allocation request message, a grant message indicating that the requested allocation is granted.

This has the advantage that time slots can be allocated to individual inductive wireless power receivers, even though the receivers cannot detect each other's communication. The allocation is granted by the single power transmitter which is able to communicate with each of the power receivers, and is therefore also able to detect collisions caused by two receivers communicating simultaneously.

In an embodiment, the message indicating that the unallocated communication time slot is unallocated is part of the synchronization message immediately preceding the unallocated communication time slot. In another embodiment the reception status message and the grant message are part of the synchronization message immediately following the unallocated communication time slot. This has the advantage that the communication remains compact and efficient, which is necessary, given the low bit rates that can be achieved in practice by modulation of the power signal.

In a further embodiment, the duration of the synchronization messages marking the start of the communication time slots and the frames is in a range of 30 to 60 milliseconds. In yet another embodiment the duration of the communication time slots is in a range of 30 to 60 milliseconds. These have the advantage to make the communication approach compatible with the existing Qi wireless power specification in which a 'digital ping window' duration of 65 msec is specified. Staying within that duration ensures that a power transmitter running the above protocol can also detect and correctly operate with a power receiver that is only compatible with the already existing specification.

According to a second aspect of the invention the object is achieved by an inductive wireless power transmitter comprising a primary coil for transferring an inductive power signal to at least two inductive wireless power receivers, a power converter for providing power to the primary coil, a power modulation and demodulation unit for modulating and demodulating the inductive wireless power signal, and a communication and control unit, the communication and control unit being arranged to control the power modulation and demodulation unit to communicate with the inductive wireless power receivers in communication time slots contained in repeating frames, and the communication and control unit being further arranged to execute the following communication protocol:

send to the receivers synchronization messages marking the start of the communication time slots and the frames;

send to the receivers, before the start of an unallocated communication time slot, a message indicating that the unallocated communication time slot is unallocated;

if a first inductive wireless power receiver, during the unallocated communication time slot, sends an allocation request message requesting allocation of the unallocated communication time slot to the first receiver, then receive the allocation request message;

send to the receivers, after the end of the unallocated communication time slot, a reception status message indicating reception success of a message during the unallocated communication time slot;

if an allocation request message was successfully received during the unallocated communication time slot, then further send to the receivers, after the end of the unallocated communication time slot, a grant message indicating that the requested allocation is granted.

This inductive wireless power transmitter has the advantage that it can allocate time slots to individual inductive wireless power receivers, even though the receivers cannot detect each other's communication. The allocation is granted by the power transmitter which is able to communicate with each of the power receivers, and is therefore also able to detect collisions caused by two receivers communicating simultaneously.

According to a third aspect of the invention, the object is achieved by an inductive wireless power receiver comprising a secondary coil for receiving an inductive wireless power signal from an inductive wireless power transmitter, a power converter for converting the power signal to an output power, a power modulation and demodulation unit for modulating and demodulating the inductive wireless power signal, and a communication and control unit the communication and control unit being arranged to control the power modulation and demodulation unit to communicate with an inductive wireless power transmitter, in communication time slots contained in repeating frames, and further arranged to execute the following communication protocol:

receive from the transmitter synchronization messages marking the start of the communication time slots and the frames, receive from the transmitter, before the start of an unallocated communication time slot, a message indicating that the unallocated communication time slot is unallocated, if the receiver needs to communicate with the transmitter, send to the transmitter, during the unallocated communication time slot, an allocation request message to request allocation of the unallocated communication time slot to the receiver, receive from the transmitter, after the end of the unallocated communication time slot, a reception status message indicating reception success of a message during the unallocated communication time slot, receive from the transmitter, in case of successful reception of the allocation request message, a grant message indicating that the requested allocation is granted.

This inductive wireless power receiver has the advantage that it can request and receive allocation of time slots from an inductive wireless power transmitter, and thus communicate without collision with other receivers communicating simultaneously even though the receivers cannot detect each other's communication. The allocation is granted by the power transmitter which is able to communicate with each of the power receivers, and is therefore also able to detect collisions caused by two receivers communicating simultaneously.

These and other aspects of the invention will be apparent from and elucidated with reference to the embodiment(s) described hereinafter.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

DETAILED DESCRIPTION OF EMBODIMENTS

The following description focuses mainly on embodiments of the invention applied in for example wirelessly charging the batteries of mobile phones. However, it must be appreciated that the invention is not limited to that application only, but may be applied in many other devices such as smart watches, tablets, laptops, shavers, electrical toothbrushes, cooking or kitchen appliances, ranging in power transfer need from 1-5 watt for the smaller devices to much higher values.

Throughout the document, inductive wireless power transmitters and inductive wireless power receivers are also simply referred to as power transmitter and power receiver, or even just transmitter and receiver.

Figure 1:
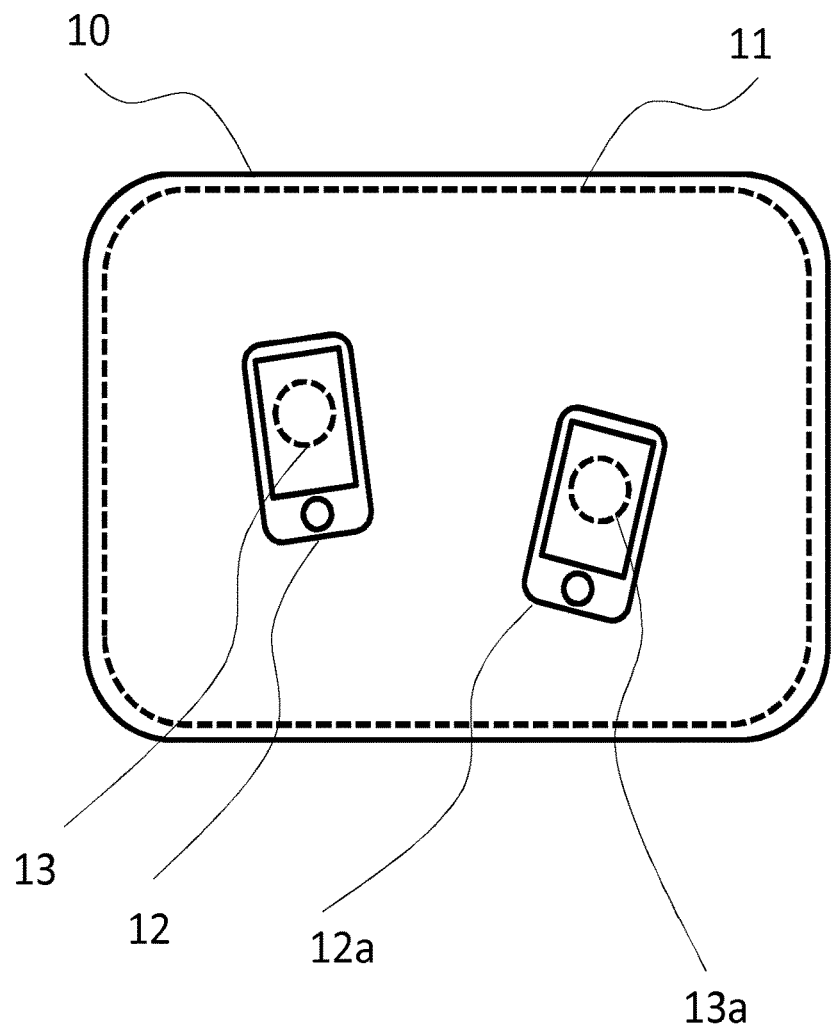
FIG. 1 illustrates a charge pad with two chargeable mobile devices.

FIG. 1 illustrates an example of a wireless power application. Two mobile devices 12 and 12a are placed on a wireless charging pad 10. This charging pad is just an example and may come in many forms, it may be a separate device or e.g. be part of a car dashboard, or built in to a work top surface or integrated in a piece of furniture. The charging pad is equipped with a single primary coil 11, and acts as an inductive wireless power transmitter. The mobile devices are each equipped with a secondary coil 13 and 13a, and act as inductive wireless power receivers. The charging pad sends an alternating current through the primary coil, which causes an alternating magnetic field. This magnetic field in turn induces an alternating voltage and current in the two secondary coils, which can be rectified and used to charge the batteries of the mobile devices. Thus power is transferred from charger to mobile device wirelessly, as an inductive wireless power signal. The principle is similar to a traditional transformer, but with much weaker coupling, and the two coils now reside in separate devices.

Typically the amount of power to be transferred is around 1 to 5 watt or more, depending on the application and on the requirements of the receiver. A secondary coil in a wireless power receiver in these applications will typically be in a size range fitting a portable device, say 1 to 15 cm in diameter for devices ranging from smart watches to kitchen appliances. The primary coil may be about the same size, or may be larger in order to accommodate multiple receivers, as illustrated in FIG. 1. Instead of a single large primary coil, a number of primary coils in series or in parallel may also be used and operated almost the same as a single coil.

In the example of FIG. 1, two mobile devices are being charged at the same time. It may well be that one device has other power requirements than the other, for example because one device is already fully charged while the other is not, or because one of the devices cannot handle a power level as high as the other device can. Both devices must be able to communicate their power needs to the charging pad. This can be achieved by modulation of the power transferred through load modulation on the receiver side: if a receiver varies the current through the secondary coil, for example by switching an additional load such as a resistor in series or parallel, this will lead to a modulation of the current through the primary coil as well, due to the mutual induction between primary and secondary coil. Thus the receiver can modulate the inductive wireless power signal. These modulations can readily be detected in the power transmitter, and in this way bit or byte coded messages can be transferred from power receiver to power transmitter. The mutual induction between the two secondary coils 13 and 13a of the two mobile devices, however, is very low due to their poor alignment, and therefore the two mobile devices cannot communicate with each other in the same way, in fact can they cannot detect if another receiver device is communicating. It may therefore occur that the two devices attempt to communicate with the charging pad simultaneously, which leads to errors in reception of the communication and to both messages being lost. Simply trying again later is not an acceptable solution, as some of the data may be time critical. For example, a message that the power must immediately be switched off should not be delayed too much as that could potentially lead to damage.

The inventors have realized that a solution is needed that enables timely communication between multiple inductive wireless power receivers and a single inductive wireless power transmitter. Since the receivers cannot detect each other, it is not possible for a receiver to notice that another receiver is communicating simultaneously. The inventors have realized this, and concluded that the communication must be coordinated by the power transmitter, which is able to communicate with each of the coupled receivers.

Figure 2:
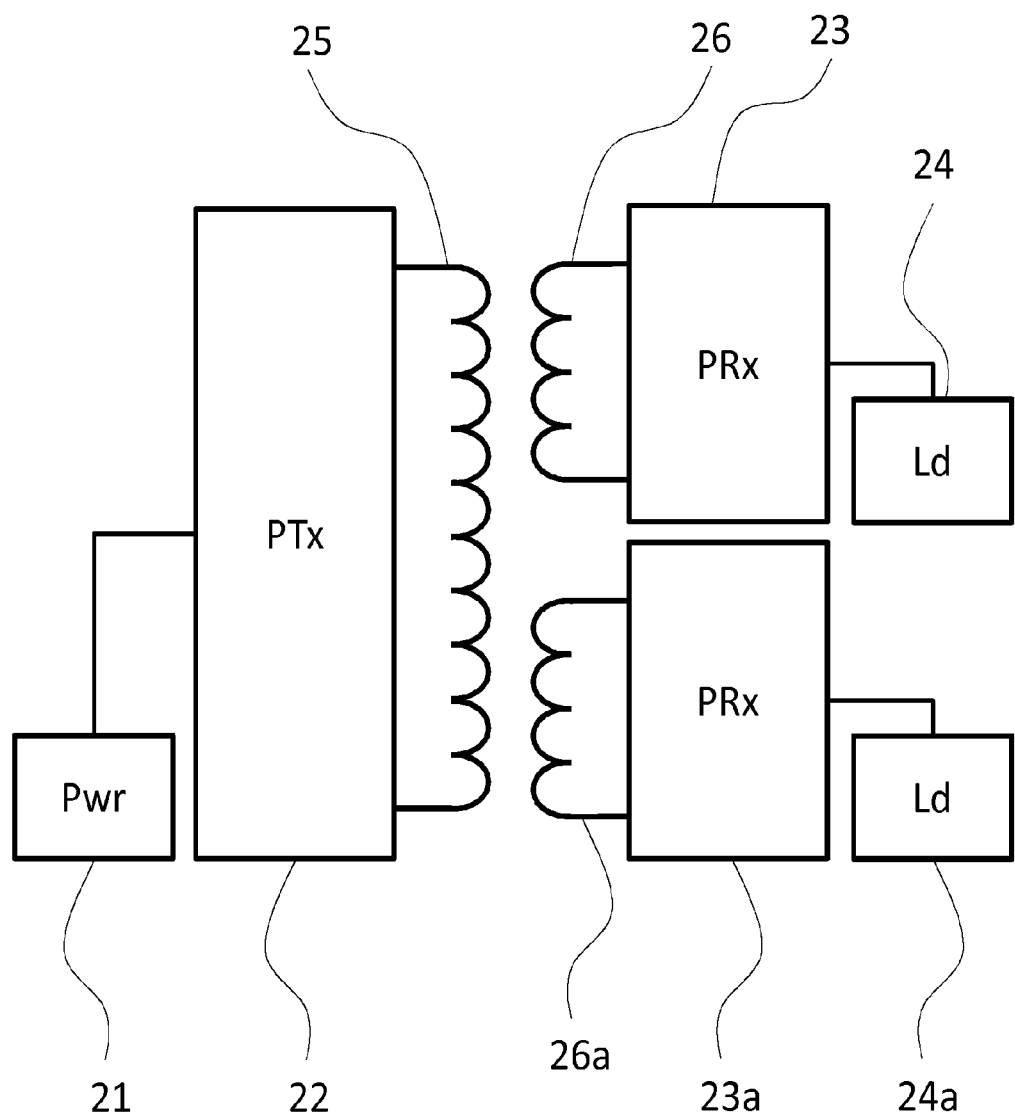
FIG. 2 illustrates a wireless power transmitter and two receivers.

FIG. 2 schematically illustrated a single inductive wireless power transmitter 22 (PTx) coupled to two inductive wireless power receivers 23 and 23a (PRx). The power transmitter comprises a primary coil 25, and obtains power from a power source 21, which may for example be the mains electricity. The two power receivers each comprise a secondary coil, 26 and 26a, and send the power they receive to a load, 24 and 24a. This load may for example be a battery that is to be charged, but many other options are possible, for example an electromotor may be powered, or a resistive element may be powered for heating purposes.

Figure 3:
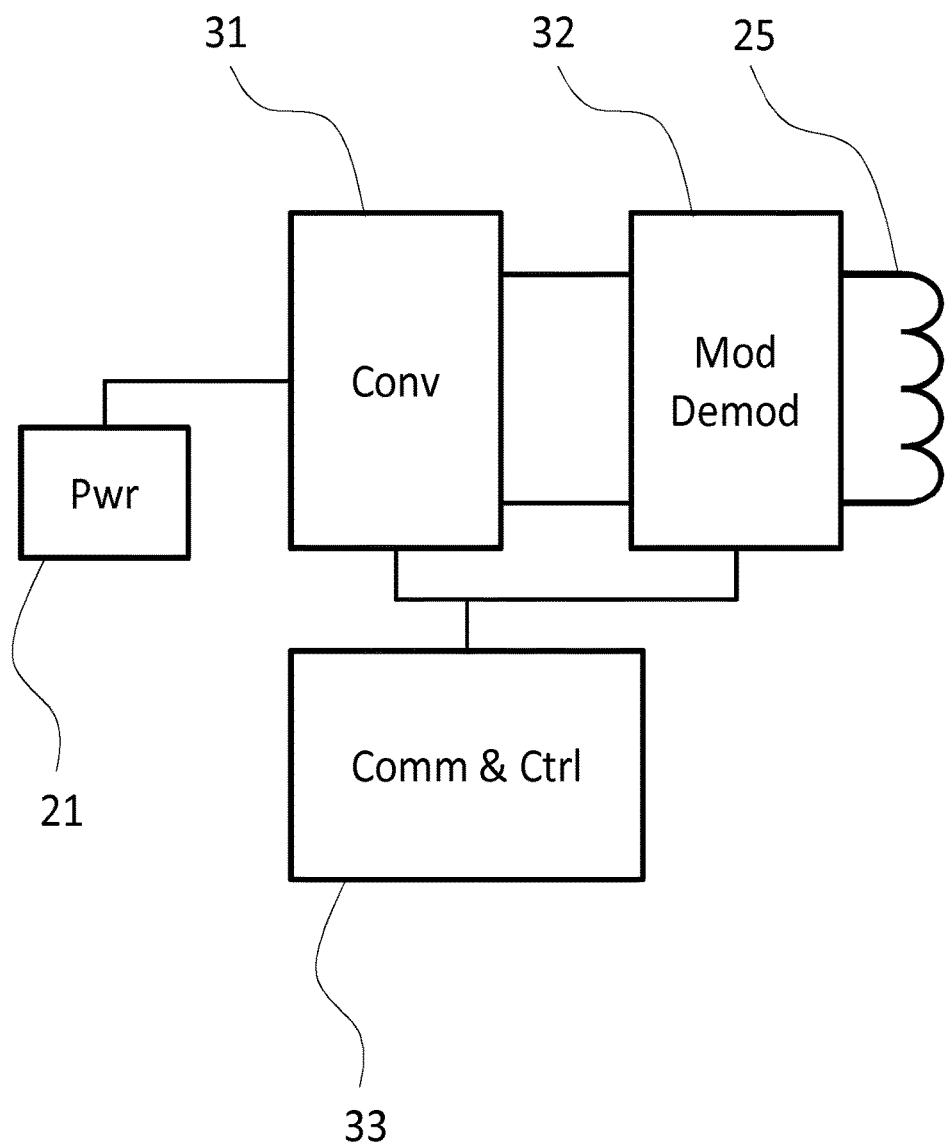
FIG. 3 illustrates a wireless power transmitter.

FIG. 3 schematically shows more detail of an inductive wireless power transmitter. The transmitter comprises a primary coil 25 for transferring an inductive wireless power signal to coupled inductive wireless power receivers, and an input for power coming from the power source 21. Additionally it comprises a power converter 31, a power modulation and demodulation unit 32, and a communication and control unit 33.

The power converter 31 converts the input power received from the power source 21 into a power signal suitable for driving the primary coil. For example, it may convert an AC or DC input power to an AC power of a frequency suitable for inductive wireless power transfer.

The power modulation/demodulation unit 32 enables communication with coupled receivers by modulating and demodulating the inductive wireless power signal. When a receiver sends a communication message by modulating the current through its secondary coil as described above, the current through the primary coil in the transmitter will be modulated as well. In this way, the inductive wireless power signal is modulated by the receiver. This can be detected by monitoring the current through the primary coil or the voltage across the primary coil in the modulation/demodulation unit 32. The voltage or current variations are demodulated and translated into bits and bytes and interpreted by the communication and control unit 33.

To send a communication message in the form of a pattern of bits or bytes to a receiver, the modulation/demodulation unit 32 modulates the current through the primary coil, thereby modulating the inductive wireless power signal being transferred, which leads to a modulation in the current through the secondary coils as well due to the mutual induction. The modulation may be amplitude modulation, which may be achieved for example by switching a resistor in series or parallel to the primary coil. Alternatively frequency or phase modulation may be applied, where the frequency or phase of the AC current through the primary coil is modulated, which again can be detected in the receiver.

The communication and control unit 33 controls the power converter and handles the communication in conjunction with the modulation and demodulation unit 32. It sends and receives messages by controlling the modulation/demodulation unit and it controls the operation of the power transmitter. For example it may send a short inductive power pulse, a 'ping', to check if any receivers are present. If a receiver is present, it may respond with a message indicating its power needs. The communication and control unit, upon receiving this message may switch on power transmission continuously, controlling the power converter 31 to maintain the required power level. When the receiver no longer needs power, for example because a battery is fully charged, this again will be communicated by sending a message from receiver to transmitter, and the communication and control unit 33 will, upon reception of this message, switch off the power transmission by controlling the power converter 31, at least if no other device still needs powering.

Figure 4:
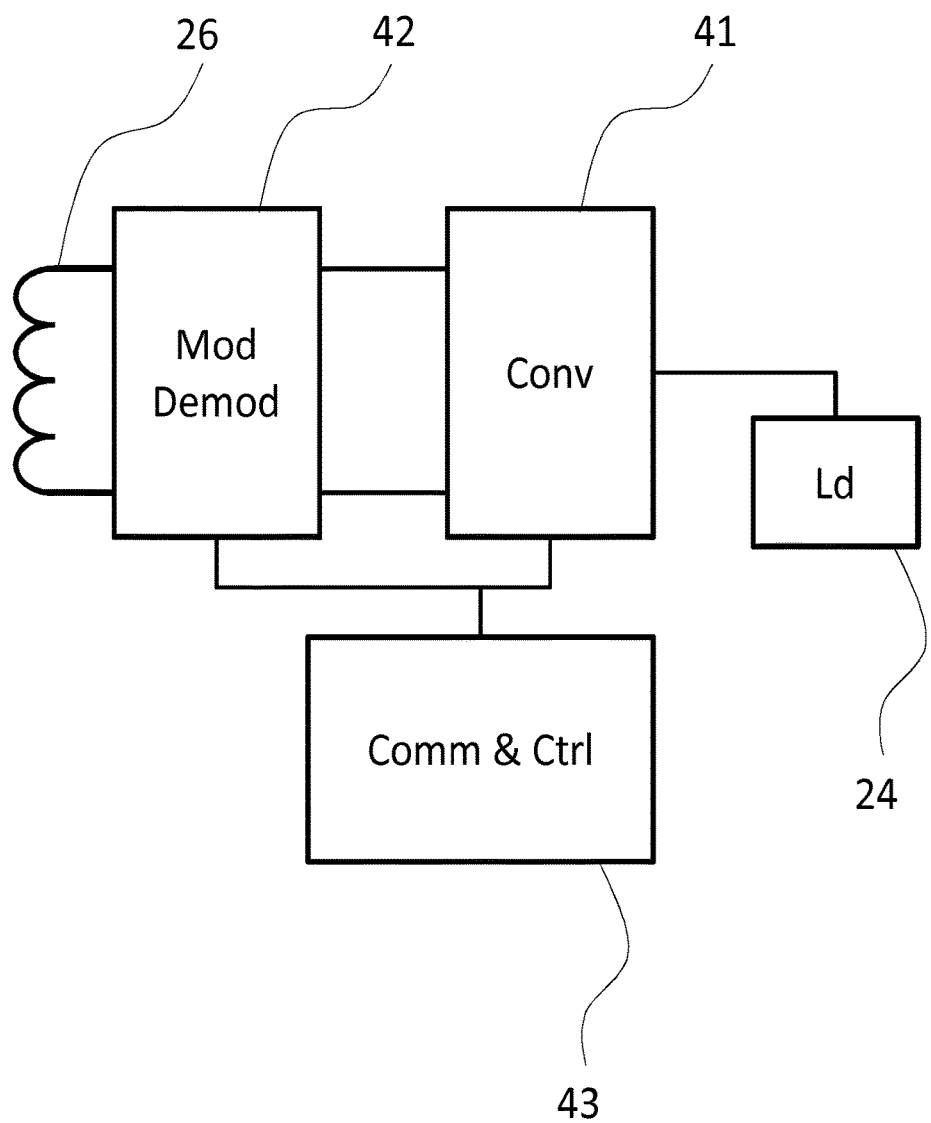
FIG. 4 illustrates a wireless power receiver.

FIG. 4 schematically shows more detail of an inductive wireless power receiver. The receiver comprises a secondary coil 26, and an output for the power to a load 24. Additionally it comprises a power converter 41, a power modulation and demodulation unit 42, and a communication and control unit 43.

The power converter 41 converts the AC inductive power signal received by the secondary coil into an output power suitable for driving the load. For example, it may convert the received power signal to an AC or DC power suitable for the load.

The power modulation/demodulation unit 42 enables communication with a coupled power transmitter. It can modulate the inductive wireless power signal by load modulation as described above. When a transmitter sends a communication message by modulating the amplitude of the inductive wireless power signal as described above, the current through the secondary 26 coil in the receiver will be modulated in amplitude as well. This can be detected by monitoring the current through the secondary coil or the voltage across the secondary coil in the modulation/demodulation unit 42. The voltage or current variations are translated into bits and bytes and interpreted by the communication and control unit 33. In case the power transmitter uses frequency modulation of the power signal for communication, then the current through the secondary coil in the receiver will be frequency modulated as well. This can be detected by monitoring the frequency, for example by detecting zero-transitions of the current in the secondary coil, or of the voltage across the secondary coil, and measuring the duration of one or more cycles.

The communication and control unit 43 controls the power converter and handles the communication in conjunction with the modulation/demodulation unit. It sends and receives messages by controlling the modulation/demodulation unit, and it controls the operation of the power receiver. For example it may detect a short inductive power pulse, a 'ping', sent by a power transmitter to check if any receivers are present. It may then respond with a message indicating its power needs. When subsequently the power transmitter switches on power transmission continuously, the communication and control unit 43 engages the power converter 41 to properly feed the wirelessly received power to the load 24. When the load no longer needs power, for example because a battery is fully charged, the communication and control unit in the power receiver may send a message to the transmitter to indicate no more power is needed, and disengage the power converter.

The communication and control units 33 and 43 may be implemented in many ways, including dedicated electronic circuits, field-programmable gate arrays, or with general purpose microprocessors and memory, configured or programmed to run the required methods and protocols for communication and control according to the invention.

Figure 5:
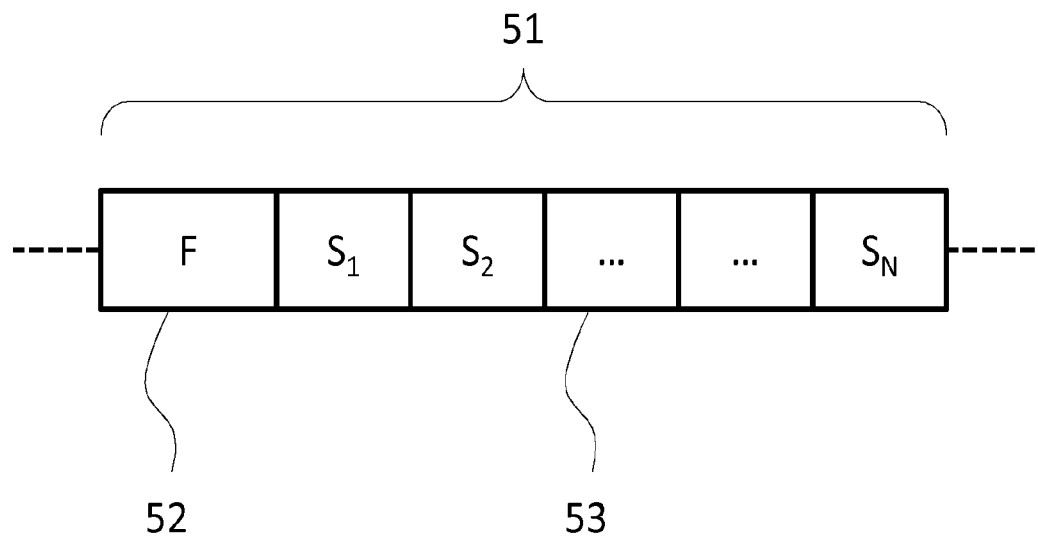
FIG. 5 illustrates a frame comprising time slots.

The inventors have realized that the communication between a power transmitter and one or more power receivers must be coordinated by the transmitter, because the receivers are not able to communicate with each other, or even detect any communication by another power receiver. Therefore a power receiver is not able to determine by itself if the communication channel is free to use, or already occupied by another receiver. The inventors have adopted a solution in which the communication is handled in time slots, and in which multiple time slots are contained in communication frames, which repeat in time. The general principle is illustrated in FIG. 5. In this example a frame 51 starts with a frame header 52, and comprises N time slots 53, labelled $S_1$-$S_N$. Here N may be a fixed integer number, chosen to be at least equal to the maximum number of power receivers that a power transmitter is designed to communicate with. For example, if a maximum of 4 mobile phones fit on a charging pad such as illustrated in FIG. 1, then N must be chosen at least equal to 4. The value of N may also be determined for example by a standard.

Figure 6:
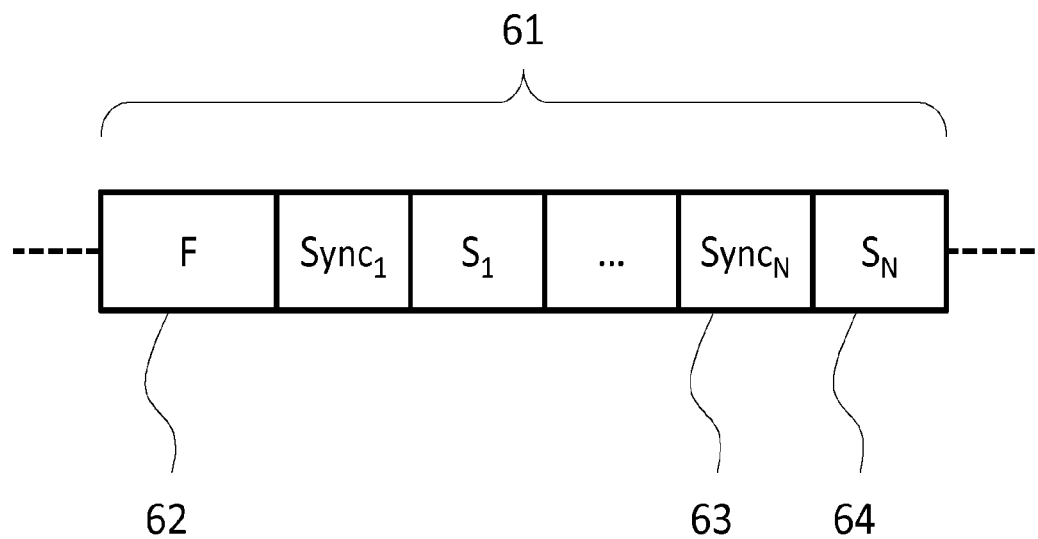
FIG. 6 illustrates a communication frame comprising synchronization slots.

In the frame header the power transmitter will communicate, while the slots $S_1$-$S_N$ are reserved for communication by the power receivers. To avoid simultaneous communication by receivers, the time slots need to be allocated to individual receivers. To enable quick allocation, the communication frames according to the invention comprise additional synchronization time slots, as illustrated in FIG. 6. A communication frame 61 starts with a frame header 62 and comprises n time slots 64, labelled $S_1$-$S_N$. Each time slot 64 is preceded by a synchronization time slot 63, labelled $Sync_1$-$Sync_N$. In this approach the frame header 62 and the synchronization time slots 63 are used for communication by the power transmitter, and the time slots 64 are used for communication by the power receivers. It is possible to omit a separate frame header, and instead have the first synchronization time slot provide frame header functionality.

During the synchronization time slots the power transmitter sends a synchronization message, a bit pattern or a sequence of bits. These messages serve multiple purposes. Firstly, they mark the beginning of the next communication time slot for the receivers, and thus maintain the time base for communication. Secondly, the synchronization message comprises information on the allocation status of the next communication time slot. If the next time slot is not yet allocated to a receiver, the message will indicate that it is unallocated or free. If on the other hand the next time slot is allocated to a particular receiver, the synchronization message will indicate that it is allocated, and which receiver it is allocated to. Thirdly, the synchronization message can indicate success or failure of reception by the power transmitter of a communication message in the preceding communication time slot. Fourthly, the synchronization message can comprise a response to a message successfully received in the preceding communication time slot.

Note that in FIG. 6 no synchronization slot follows the last communication time slot $S_N$. Instead, the first synchronization time slot in the following frame may serve to indicate successful reception in that slot.

Once a power receiver has a time slot allocated to it, it may use that time slot for sending messages to the power receiver. Other receivers will not use that same time slot, as it is flagged as being allocated.

Figure 7:
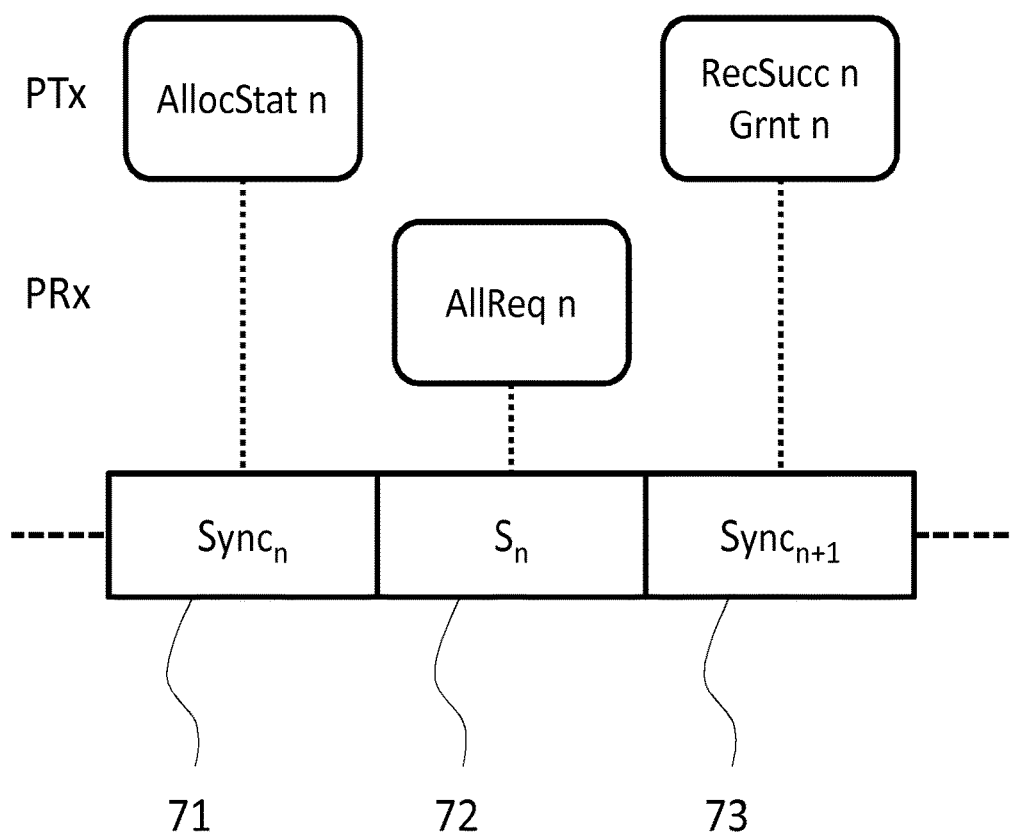
FIG. 7 illustrates a method for allocating time slots.

If a particular power receiver, hereinafter referred to as the first receiver, needs to communicate but does not have a time slot allocated to it, it needs to request allocation of a free time slot. This is illustrated in FIG. 7, focussing on an unallocated time slot 72, labelled $S_n$. In the preceding synchronization time slot 71, labelled $Sync_n$, the power transmitter will indicate the allocation status of time slot $S_n$, which in this example is unallocated. During the unallocated time slot $S_n$ the first power receiver will send to the power transmitter an allocation request message, requesting that the slot $S_n$ be allocated to it.

In the following synchronization time slot 73, labelled $S_{n+1}$, the power transmitter will send a message indicating if a message was successfully received during the time slot $S_n$. If the allocation request was successfully received and the slot is free, the power transmitter can grant the allocation and send a message indicating the grant of allocation of slot Sn to the first receiver.

If however a second receiver attempted to communicate as well during the time slot $S_n$, for example because it too requested allocation of the same time slot, then the two communication attempts interfere in the primary coil of the power transmitter and no message will be correctly received by the power transmitter. The transmitter will therefore send a message during the following synchronization time slot that there was no successful reception of a message during time slot $S_n$, and no allocation will consequently be granted. This indicates to the first and second receivers that their allocation requests have failed, and they need to try again to achieve a time slot allocation. In order to avoid the same collision between the two power receivers competing for allocation of the next time slot, the receivers will not immediately try again, but wait for a number of slots. Of course the two receivers must wait for periods of different duration, or else the collision will repeat itself For example a (semi)random waiting period can be applied, which strongly reduces the likelihood that a collision will repeat itself multiple times.

If a receiver does not use the time slot allocated to it, the communication and control unit 31 may decide de de-allocate the time slot. It may do so, for example, after the allocated time slot has not been used for communication by the receiver in several consecutive frames. The time slot will then be flagged as unallocated again, and is available for allocation to receivers that request it.

The inventors have realized that the duration of the communication of time slots described above must be chosen wisely. Due to the nature of the modulation methods and the nature of the devices, the bitrate achieved in the communication will be low, and the time slots cannot be chosen too short. In the Qi standard for a single power transmitter working with a single power receiver, it is required that a receiver responds within 65 msec to a transmitter 'ping' as described above. When a wireless power receiver detects a power transmitter, it must be possible to establish well within those 65 msec whether the transmitter supports the time slotted communication, or is of an older type that does not. Therefore the duration of a sync message time slot 71 is preferably chosen in a range of 30 to 60 msec. Preferably also the time slot for receiver communication 72 is chosen in the same range. The inventors have found that a period of 50 msec works well for both the synchronization time slot and the communication time slot. With these limitations, a receiver can always detect at least a part of a synchronization message within the 65 msec, and thus determine the communication capabilities of the transmitter.

In general, the bit rates achievable by modulation in inductive wireless power transfer as described are low, and only a limited number of bits may be sent in a synchronization time slot. This requires efficient coding of the information to be conveyed, which includes successful reception of a message in the preceding communication time slot, grant or reject of an allocation request received in the preceding communication time slot, and allocation status of the next communication time slot. This may, for example, be achieved by an efficient 3-bit coding as illustrated in Table 1, where pp indicates a 2-bit response to the preceding communication time slot, and n indicates a 1-bit allocation status of the next communication time slot (and x is used to indicate 'any' bit value). Here the message is efficiently formed of a short part indicating an understanding of the communications status, combined with a short part indicating the availability of the successive time slot.

TABLE 1 example of synchronization message coding

| pp n | Meaning |
|---|---|
| 00 x | No communication received in preceding slot |
| 01 x | Collision detected in preceding slot |
| 10 x | Data correctly received in preceding slot, allocation of slot rejected |
| 11 x | Data correctly received in preceding slot, allocation of slot accepted |
| xx 0 | Succeeding slot is free |
| xx 1 | Succeeding slot is occupied |

To achieve a duration of the synchronization time slot close to, but not exceeding, a chosen maximum duration, for example 50 msec, a small number of preamble bits may be used. The number of preamble bits may be adjusted to the operating conditions of the wireless power transfer system, so as to achieve a synchronization time slot as close as possible to the chosen duration.

Figure 8:
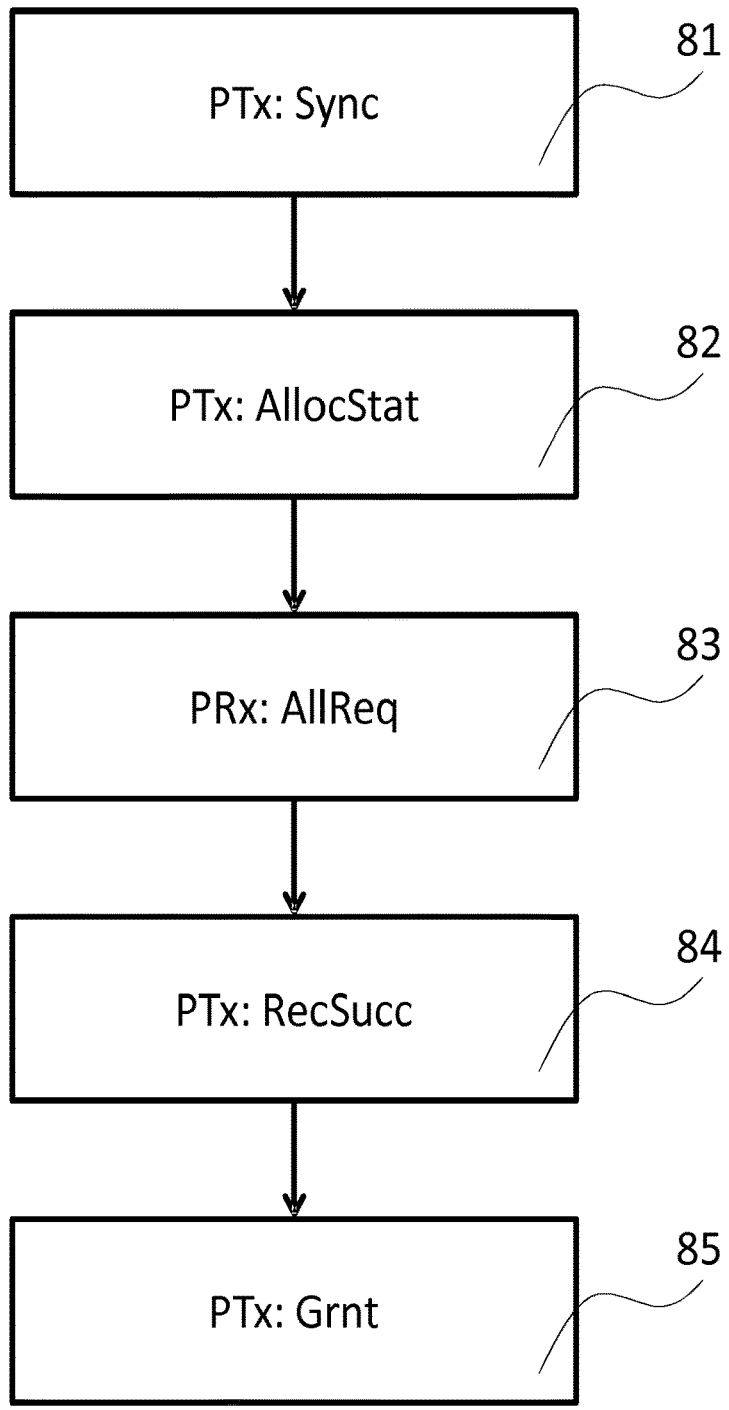
FIG. 8 illustrates a protocol for allocating communication time slots.

A typical method of allocating communication time slots to wireless power receivers following a protocol as described above is illustrated in FIG. 8. In a first step 81, an inductive wireless power transmitter sends synchronization messages to mark the start of the communication time slots. This enables the inductive wireless power receivers to detect the timing of the communication frames and slots, and to synchronize to their timing. In a next step 82, the wireless power transmitter sends a message indicating the allocation status of a subsequent time slot. For an unallocated time slot, this message will indicate that the slot is unallocated. This message needs to be sent before the start of that unallocated time slot.

In a next step 83, a wireless power receiver in need of a time slot for communication, requests allocation of that time slot, so it can use it for communication in subsequent communication frames. This happens during the unallocated time slot.

In a next step 84, the power transmitter sends a message indicating if any communication was successfully received during the unallocated time slot. This happens after the end of the unallocated time slot in question. If the allocation request message was indeed successfully received, in a next step 85 the power transmitter sends a further message indicating that the time slot is now allocated to the receiver that requested it.

While the invention has been illustrated and described in detail in the drawings and foregoing description, such illustration and description are to be considered illustrative or exemplary and not restrictive; the invention is not limited to the disclosed embodiments. The mere fact that certain measures are recited in mutually different dependent claims does not indicate that a combination of these measures cannot be used to advantage. In fact many features may be combined which a skilled person will recognize as mutually compatible, such as the durations of various time slots and messages, the nature of the messages sent, or the inductive power levels transferred.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfil the functions of several items recited in the claims. Any reference signs in the claims should not be construed as limiting the scope.

The invention claimed is:

1. A method of allocating communication time slots contained in repeating frames for communication between an inductive wireless power transmitter and at least two inductive wireless power receivers, wherein the power transmitter and the power receivers are arranged to communicate by means of modulation and demodulation of an inductive power signal, the method comprising the steps of:
   sending, by the transmitter, synchronization messages marking the start of the communication time slots and the frames,
   sending, by the transmitter, before the start of an unallocated communication time slot, a message indicating that the unallocated communication time slot is unallocated,
   sending, by a first receiver, during the unallocated communication time slot, an allocation request message to the transmitter to request allocation of the unallocated communication time slot to the first receiver,
   sending, by the transmitter, after the end of the unallocated communication time slot, a reception status message indicating reception success of a message during the unallocated communication time slot,
   further sending, by the transmitter, in case of successful reception of the allocation request message, a grant message indicating that the requested allocation is granted.

2. The method according to claim 1, wherein the message indicating that the unallocated communication time slot is unallocated is part of the synchronization message immediately preceding the unallocated communication time slot.

3. The method according to claim 1, wherein the reception status message and the grant message are part of the synchronization message immediately following the unallocated communication time slot.

4. The method according to claim 1, wherein the first receiver, in case no grant message is sent by the transmitter in response to the allocation request message, waits for a period of more than one frame before again requesting allocation of a communication timeslot to the first receiver.

5. The method according to claim 1, wherein the duration of the synchronization messages marking the start of the communication time slots and the frames is in a range of 30 milliseconds to 60 milliseconds.

6. The method according to claim 1, wherein the duration of the communication time slots is in a range of 30 to 60 milliseconds.

7. An inductive wireless power transmitter comprising:
   a primary coil, wherein the primary coils is arranged to transfer an inductive power signal to at least two inductive wireless power receivers,
   a power converter, wherein the power converter is arranged to provide power to the primary coil,
   a power modulation and demodulation unit, wherein the power modulation and demodulation unit is arranged to modulate and demodulate the inductive wireless power signal, and
   a communication and control unit,
   the communication and control unit arranged to control the power modulation and demodulation unit to communicate with the inductive wireless power receivers in communication time slots contained in repeating frames, and the communication and control unit being further arranged to execute the following communication protocol:
   send to the receivers synchronization messages marking the start of the communication time slots and the frames;
   send to the receivers, before the start of an unallocated communication time slot, a message indicating that the unallocated communication time slot is unallocated;
   if a first inductive wireless power receiver, during the unallocated communication time slot, sends an allocation request message requesting allocation of the unallocated communication time slot to the first receiver, then receive the allocation request message;
   send to the receivers, after the end of the unallocated communication time slot, a reception status message indicating reception success of a message during the unallocated communication time slot;
   if an allocation request message was successfully received during the unallocated communication time slot, then further send to the receivers, after the end of the unallocated communication time slot, a grant message indicating that the requested allocation is granted.

8. The inductive wireless power transmitter according to claim 7, wherein the communication and control unit is further arranged to send the message indicating that the unallocated communication time slot is unallocated as part of the synchronization message immediately preceding the unallocated communication time slot.

9. The inductive wireless power transmitter according to claim 7, wherein the communication and control unit is further arranged to send the message indicating that the unallocated communication time slot is unallocated as part of the synchronization message marking the start of the frame comprising the unallocated communication time slot.

10. The inductive wireless power transmitter according to claim 7, wherein the communication and control unit is further arranged to send the reception status message and the grant message as part of the synchronization message immediately following the unallocated time slot.

11. The inductive wireless power transmitter according to claim 7, wherein the duration of the synchronization messages marking the start of the communication time slots and the frames is in a range of 30 milliseconds to 60 milliseconds.

12. The inductive wireless power transmitter according to claim 7, wherein the duration of the communication time slots is in a range of 30 milliseconds to 60 milliseconds.

13. An inductive wireless power receiver comprising:
   a secondary coil, wherein the secondary coil id arranged to receive an inductive wireless power signal from an inductive wireless power transmitter,
   a power converter, wherein the power converter arranged to convert the power signal to an output power,
   a power modulation and demodulation unit, wherein the power modulation and demodulation unit is arranged to modulate and demodulate the inductive wireless power signal, and a communication and control unit the communication and control unit being arranged to control the power modulation and demodulation unit to communicate with an inductive wireless power transmitter, in communication time slots contained in repeating frames, and further arranged to execute the following communication protocol:

receive from the transmitter synchronization messages marking the start of the communication time slots and the frames, receive from the transmitter, before the start of an unallocated communication time slot, a message indicating that the unallocated communication time slot is unallocated, if the receiver needs to communicate with the transmitter, send to the transmitter, during the unallocated communication time slot, an allocation request message to request allocation of the unallocated communication time slot to the receiver, receive from the transmitter, after the end of the unallocated communication time slot, a reception status message indicating reception success of a message during the unallocated communication time slot, receive from the transmitter, in case of successful reception of the allocation request message, a grant message indicating that the requested allocation is granted.

14. The inductive wireless power receiver according to claim 13, further arranged to wait for a period of more than one frame before again requesting allocation of a communication timeslot to the first receiver, in case no grant message is sent by the transmitter in response to the allocation request message.

* * * * *